United States Patent
Krummel

(10) Patent No.: US 9,405,913 B2
(45) Date of Patent: Aug. 2, 2016

(54) METHOD FOR DEFENDING AGAINST COLD-BOOT ATTACKS ON A COMPUTER IN A SELF-SERVICE TERMINAL

(71) Applicant: WINCOR NIXDORF INTERNATIONAL GMBH, Paderborn (DE)

(72) Inventor: Volker Krummel, Paderborn (DE)

(73) Assignee: Wincor Nixdorf International GmbH (DE)

( * ) Notice: Subject to any disclaimer, the term of this patent is extended or adjusted under 35 U.S.C. 154(b) by 87 days.

(21) Appl. No.: 14/536,781

(22) Filed: Nov. 10, 2014

(65) Prior Publication Data

US 2015/0161392 A1    Jun. 11, 2015

(30) Foreign Application Priority Data

Dec. 10, 2013 (EP) .................................. 13196499

(51) Int. Cl.
    G06F 12/00    (2006.01)
    G06F 21/57    (2013.01)
    G06F 21/55    (2013.01)
    G06F 21/86    (2013.01)

(52) U.S. Cl.
    CPC ............ *G06F 21/575* (2013.01); *G06F 21/554* (2013.01); *G06F 21/86* (2013.01); *G06F 2221/034* (2013.01); *G06F 2221/2143* (2013.01)

(58) Field of Classification Search
    USPC ......................................................... 726/22
    See application file for complete search history.

(56) References Cited

U.S. PATENT DOCUMENTS

| 7,343,496 | B1  |   | 3/2008  | Hsiang et al. |            |
|-----------|-----|---|---------|---------------|------------|
| 8,331,189 | B1  |   | 12/2012 | Pancoast et al.|           |
| 8,335,931 | B2  | * | 12/2012 | Lee ..........................| G06F 21/34 |
|           |     |   |         |               | 713/192    |
| 8,458,804 | B1  | * | 6/2013  | Hyde .......................| G06F 21/00 |
|           |     |   |         |               | 726/26     |
| 8,650,639 | B2  | * | 2/2014  | Adams ..................| G06F 21/554 |
|           |     |   |         |               | 713/189    |
| 9,146,883 | B2  | * | 9/2015  | Franceschini ..........| G06F 12/16 |
| 9,225,695 | B1  | * | 12/2015 | Riera .......................| G06F 21/78 |
| 2008/0222430 | A1 |   | 9/2008  | Buscaglia et al. |         |
| 2012/0079593 | A1 | * | 3/2012  | Adams ..................| G06F 21/554 |
|           |     |   |         |               | 726/23     |

(Continued)

FOREIGN PATENT DOCUMENTS

DE    10 2009 018 320    10/2010
DE    10 2011 014 665    9/2012

OTHER PUBLICATIONS

Gruhn, et al. "On the Practicability of Cold Boot Attacks" 2013 Intenational Conference on Availability, Reliability and Security (pp. 390-397).*

(Continued)

*Primary Examiner* — Amare F Tabor
(74) *Attorney, Agent, or Firm* — Gerald E. Hespos; Michael J. Porco; Matthew T. Hespos

(57) ABSTRACT

A method to defend effectively against cold-boot attacks includes checking state data stored in a state memory to which the system software has access. At least two of the state data items are checked (111; 112) to determine deviations from parameters that are defined for a normal state of the computer. If deviations from the parameters are determined for at least two of the checked state data items, at least subareas of the main memory are cleared or overwritten (120); otherwise, the main memory is not cleared or overwritten (130); then, the system startup of the computer is carried out by means of the configured system software (140).

6 Claims, 3 Drawing Sheets

(56) References Cited

U.S. PATENT DOCUMENTS

| | | | |
|---|---|---|---|
| 2012/0237024 A1* | 9/2012 | Liu | H04L 9/0869 380/44 |
| 2014/0006805 A1* | 1/2014 | Colp | G06F 12/1425 713/193 |
| 2014/0068129 A1* | 3/2014 | Chew | G06F 13/24 710/269 |

OTHER PUBLICATIONS

"Lest We Rember: Cold Boot Attacks on Encryption Keys"—Halderman, et al., Proceedings of the Usenix Security Symposium, Aug. 1, 2008, XP007910951, pp. 45-60.

European Search Report of Mar. 20, 2014.

\* cited by examiner

METHOD FOR DEFENDING AGAINST COLD-BOOT ATTACKS ON A COMPUTER IN A SELF-SERVICE TERMINAL

BACKGROUND

1. Field of the Invention

The invention relates to a method for defending against cold-boot attacks on a computer in a self-service terminal. In addition, the present invention relates to a self-service terminal, in particular an ATM machine, including a computer which is equipped for carrying out the method.

2. Description of the Related Art

Self-service terminals, in particular ATM machines, are frequently subject to manipulation attempts and other criminal acts which, among other things, have the goal of manipulating the operation of the self-service terminal and/or obtaining sensitive data such as account and customer data. The focus is on the computer which is integrated into self-service terminals, which is often implemented using a personal computer having specialized application software. Such a self-service terminal is, for example, described in DE 10 2009 018 320 A1, the personal computer used there also being referred to as a data processing unit or computer.

In the field of personal computers, also called PCs for short, many methods are known via which criminals obtain unauthorized access to the PC. In this context, so-called cold-boot attacks or cold-start attacks may be mentioned. The basis of a cold-boot attack is that, after restarting the computer or shutting down the computer, the memory content of the main memory remains in the memory for a certain period of time, although, for example, an external voltage is no longer present. During this period of time, an attacker may use specialized software to read out the memory content completely and thus gain knowledge about sensitive data such as cryptographic keys or transaction data. The period of time is a direct function of the ambient temperature. By drastically lowering the temperature, for example, by spraying the memory with liquid oxygen, the attacker can extend the available period of time up to the minute range.

Until recently, it was assumed that such attacks are practically impossible under real conditions due to the relatively short period of time. However, such attacks and their feasibility are documented in the article 'Lest We Remember: Cold Boot Attacks on Encryption Keys' by J. Alex Halderman et al., which was published in 'Proc. 2008 USENIX Security Symposium'.

The Internet encyclopedia 'Wikipedia' (see http://de.wikipedia.org/wiki/Kaltstartattacke) describes the general principle of a 'cold-start attack' and countermeasures. For example, the BIOS, i.e., the system software controlling the system startup (boot), is supposed to clear the random access memory during the so-called 'power-on self-test' (POST for short). However, this countermeasure is not a reliable approach which would be applicable in the field of self-service terminals. This is because POST does not securely and completely clear the random access memory; POST may be switched off; POST may possibly be interrupted or skipped; and POST involves a considerable delay of all restarts.

US 2012/0079593 A1 describes a system and a method for hindering cold-boot attacks, which focuses on mobile terminals such as mobile telephones or laptops. To defend against cold-boot attacks, it is described there (see text [0009] and claim 3) to monitor the temperature of the memory components and to check whether the temperature is below a threshold value, in order to determine whether or not an attack is taking place.

U.S. Pat. No. 8,331,189 B1 describes a DRAM memory module which is secured against cold-boot attacks. For this purpose, a circuit ('tamper detection circuit') is described, which detects an attack and then initiates clearing of the DRAM memory module by means of another circuit ('scrubbing circuit'). It is not described there which criterion is to be used to determine the attack. Reference is merely made (see column 1, lines 14 ff.) to the article in question 'Lest We Remember: Cold Boot Attacks on Encryption Keys' by J. Alex Halderman et al.

The object of the present invention is to provide a method for defending against cold-boot attacks which may be used in the field of self-service terminals and which overcomes the initially specified disadvantages of the prior art. In particular, cold-boot attacks are to be effectively and reliably repelled on computers in self-service terminals without having to accept a noticeable delay of all restarts.

SUMMARY OF THE INVENTION

Accordingly, a method is provided for defending against cold-boot attacks on a computer in a self-service terminal which includes the following steps, which are carried out by means of the main processor and a system software program configured for the system startup of the computer, in particular BIOS or (U)EFI:

checking state data which are stored in a state memory to which the system software has access and which include at least two of the following state data items:
first state data which indicate the period of time in which the computer was without power;
second state data which indicate the temperature of the main processor;
third state data which indicate whether a housing in which the computer is installed has been opened; and/or
fourth state data which indicate whether an external storage medium is used for the system startup of the computer which is not a component of the computer;
wherein at least two of the state data items are checked in order to determine deviations from parameters which are defined for a normal state of the computer;
if deviations from the parameters are determined for at least two of the checked state data items, at least subareas of the main memory are cleared or overwritten; otherwise, the main memory is not cleared or overwritten;
then, the system startup of the computer is carried out by means of the configured system software.

Therefore, a state memory is provided which BIOS or (U)EFI) is able to access in order always to check at least two different state criteria such as the period of time and temperature. It is also possible to check more than two criteria in any combination. As a result, the reliability of the checking result is substantially increased. If an attack is detected based on the at least two criteria, the main memory is cleared or overwritten, followed by a restart (reboot). If an attack is not detected, a restart may be carried out immediately. Thus, the method is highly efficient and results in no noticeable delay of all restarts.

The method may in particular be used at self-service terminals which are the target of potential cold-boot attacks, such as ATM machines.

The features 'first, second, third and fourth state data' are used only to indicate that various state data are checked. The description 'first, second, third and fourth' are not intended to indicate a prioritization or ranking.

It is to be noted that 'second state data' concerns the temperature of the processor, which may be ascertained very simply, since modern motherboards have corresponding temperature sensors, and a substantial reduction of the temperature of the processor may also be an indication of a cold-boot attack. In this respect, the inventor assumes the knowledge that in many cold-boot attacks, spraying the main memory with cold spray also causes the operating temperature of the processor to be decreased. This temperature reduction may be detected by the temperature sensor which is already present. The main memory may then be cleared in order to protect all sensitive data from the unauthorized access.

It is to be noted that the 'fourth state data' concerns a criterion which is related to the boot medium used. The inventor assumes the additional knowledge that booting from a non-system boot medium may be an indication of an attack. This applies in particular to self-service terminals, whose computers generally boot only from the system hard disk (internal system disk). In order to detect an attack, during rebooting, the BIOS or (U)EFI always checks to see which medium is used for booting. If booting takes place from an internal system disk (easily determined by the connection, the SNR of the disk, etc.), clearing of the memory may be omitted, since the system software does not permit reading out the memory content. However, should an external medium such as a USB stick, a Firewire hard disk, an ESATA disk, etc. be used, this may be an indication of an attack. This may be verified by checking another, different criterion such as the period of time ('first state data'). If this criterion has also been satisfied, the main memory is at least partially cleared. However, complete clearing is preferred, particularly as no normal application is currently known which reuses the content of the main memory after rebooting. Thus, completely clearing the memory is should have no effects on normal applications.

Overall, the BIOS/(U)EFI software of the PCs used in self-service terminals is extended to include the following functionality:
complete and secure overwriting of the main memory and possibly other memory areas such as graphics memory;
an extended state memory which is able to store information permanently;
checking the necessity of the complete and secure overwriting based on at least two decision or state information items such as downtime ('first state data'), processor temperature sensor ('second state data'), housing sensor (opening the housing, 'third state data').

The BIOS/(U)EFI has an internal state memory. The system software on the system PC continuously updates the state memory, in particular in the case of actions which are carried out during the shutdown or a reboot. Such updates may be carried out directly by means of an interrupt controller within the BIOS/(U)EFI in order to ensure a continuously up-to-date state.

After each reboot, the BIOS/(U)EFI checks the internal state based on at least two of the aforementioned criteria. If the check of the state data reveals that sensitive information is still possibly present in the main memory, the process for secure and complete clearing is carried out. If the check of the state data reveals that all sensitive information has been cleared from the main memory, the process of clearing the memory is skipped and the reboot is initiated directly. The decision as to whether or not clearing must be carried out is made automatically and cannot be influenced externally by third parties.

A self-service terminal is also provided, which includes a computer and which is provided to carry out the present method. The computer of the self-service terminal includes a state memory to which the system software (BIOS/(U)EFI) has access and in which at least two of the aforementioned state data items are stored, wherein the system software updates the state memory at least during each interrupt-controlled process during the shutdown and/or reboot.

Particularly advantageous embodiments of the present invention result from the subclaims.

Accordingly, it is preferably always checked whether the period of time in which the computer was without power is less than a first parameter which defines a minimum period of time which is required for clearing of the data stored in the main memory due to lack of power. The system software or the BIOS/(U)EFI will continuously update the state data in the operating state either via explicit calls of an update function or indirectly via the interrupt controller. After a reboot, this state information makes it possible for the BIOS/(U)EFI to estimate how long the PC was without power. If this 'downtime' is greater than or equal to a certain threshold value, the sensitive content has already been cleared from the main memory via the natural decay. A reboot may therefore be carried out immediately. However, if the downtime is less than the threshold value, the main memory is automatically completely and securely cleared if another criterion such as the temperature reduction has been satisfied.

Thus, it is also advantageous if it is checked whether the temperature of the main processor is less than a second parameter which defines a minimum temperature which is not undershot during normal operation of the main processor. As already described above, the temperature of the main processor may be easily measured via the sensor which is already present and may be used as an indicator of a manipulated cooling of the random access memory.

It is also preferably at least optionally checked whether a third parameter has been satisfied which indicates the state of the opened housing. This may be detected via a sensor (for example, a light, magnet, or circuit sensor) which indicates if the housing of the PC has been opened. This is advantageous, since the housing is opened during many cold-boot attacks in order to freeze the memory by means of cold spray. Since sensors are already installed on the housing doors or covers in conventional PC housings, they may be used. If the PC has been opened, this is detected by the sensor and stored as a state change. In this case, clearing of the entire random access memory must be carried out if another criterion, such as the temperature reduction of the processor, has also been satisfied. Thus, by using sensors which are already available which indicate the opening of the housing or the temperature of the processor, it is possible to detect and repel a cold-boot attack in a highly economical and reliable manner.

In preferred embodiments of the present invention, at least subareas of a graphics memory of the computer may also be cleared or overwritten if deviations from the parameters are detected for at least two of the checked state data items, i.e., if an attack has been detected.

In additional preferred embodiments of the present invention, more than two state data items may also be monitored and optionally activated. Thus, if at least three of the state data items for checking are detected, a selection of the at least two checks to be carried out is made possible to a user, preferably as a function of rights which the user has for using the computer. As a result, the aforementioned criteria are optionally deactivatably configured to have corresponding rights. The authorized user may also set the BIOS/(U)EFI in such a way that the criteria may be checked in various combinations.

The present invention is described below in greater detail based on exemplary embodiments and with reference to the accompanying drawings.

DETAILED DESCRIPTION

Figure 1:
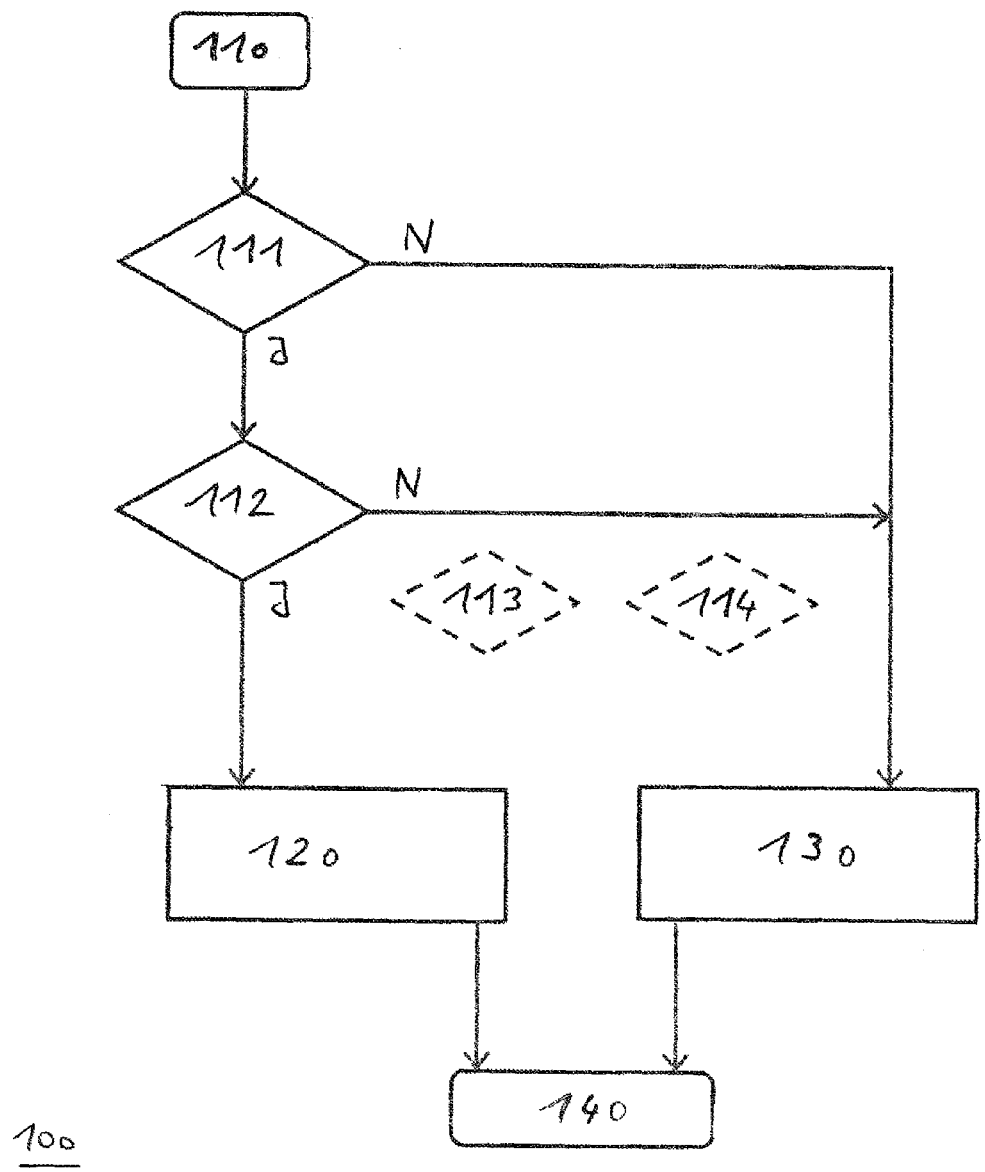
FIG. 1 shows a flow chart for a method according to a first exemplary embodiment of the present invention.
Figure 3:
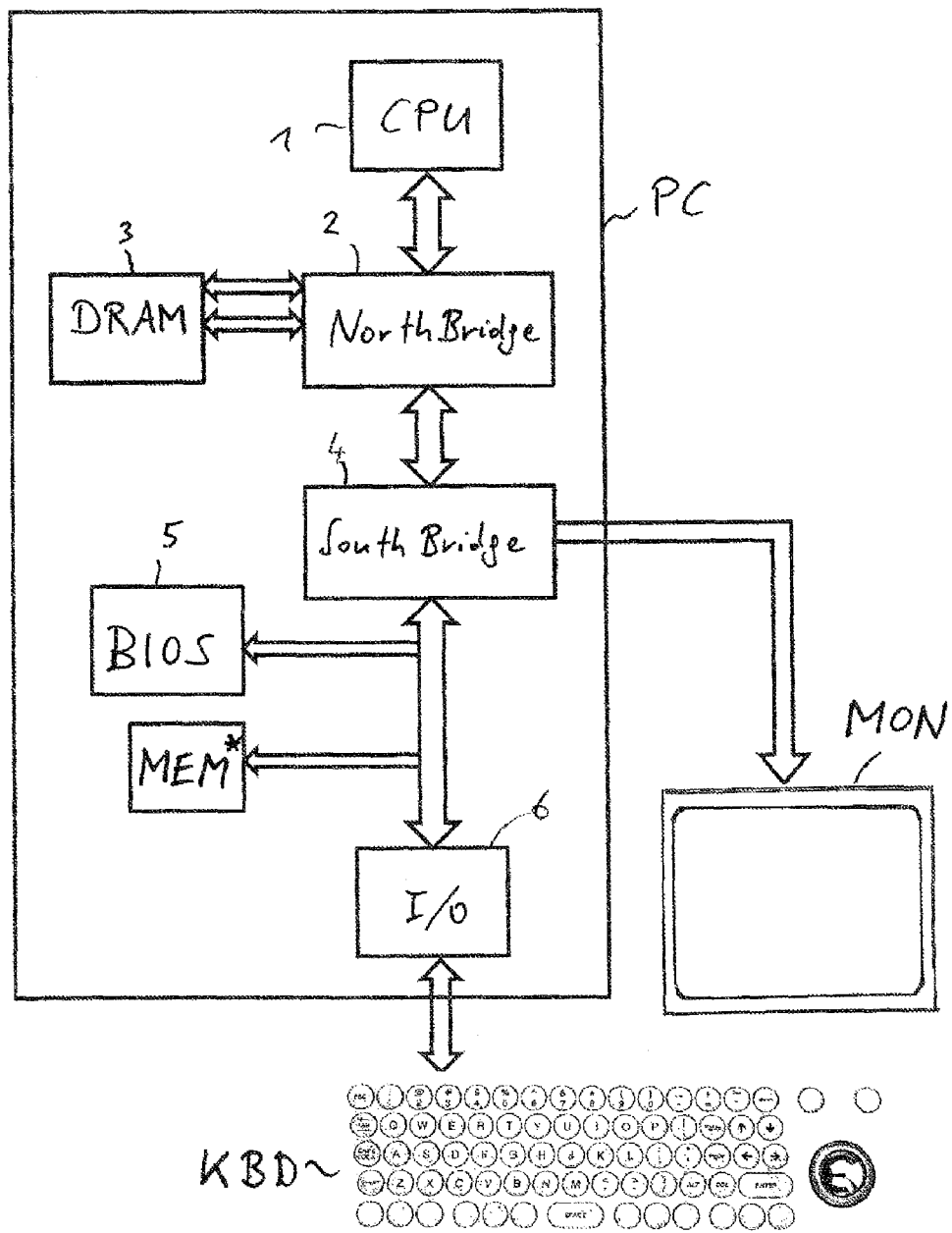
FIG. 3 shows a structure of a self-service terminal which carries out the method.

FIG. 1 depicts a flow chart for a method according to a first exemplary embodiment of the present invention. The method 100 is used for defending against cold-boot attacks and is carried out by a computer which is installed in a self-service terminal, as shown by way of example based on FIG. 3. Therefore, FIG. 3 is also included in the following description:

The computer PC is essentially made up of a main processor 1 (central processing unit—CPU), which accesses the main memory or random access memory 3, which is made up of direct-access memory chips 3 (dynamic random-access memory—DRAM), via the so-called north bridge 2 of the chip set. The system software 5 (for example, BIOS) may be loaded and executed via the so-called south bridge 4 of the chip set. A graphics card for a monitor MON is also connected via the south bridge 4. In addition, a connection to external devices such as a keyboard KBD exists via I/O interfaces 6. The keyboard and the monitor are part of the essential operating elements of the self-service terminal.

In addition to a conventional PC configuration, the computer includes another state memory MEM*, to which the system software 5 has direct access. The following state data are stored in this state memory, which are described in greater detail.

Based on FIG. 1, a first exemplary embodiment for the method for defending against cold-boot attacks is now described:

The method is carried out by means of the main processor 1 (see FIG. 3) and a system software program 5 which is configured for the system startup of the computer PC. The present example relates to the UEFI (unified extensible firmware interface), which is regarded as the successor to the EFI (extensible firmware interface) and forms the interface between the firmware, the individual components of a computer and the operating system. From a logical point of view, the UEFI is situated below the operating system and constitutes the successor to the PC BIOS, with a focus on 64-bit systems. Secure Boot is a component of current UEFI versions, which limits booting to previously signed boot loaders, thus inhibiting malicious software or other undesirable programs at startup. Instead of UEFI, the method could also be carried out with the aid of an EFI or BIOS, etc. Therefore, the discussion below also generally refers to system software.

In a first step 110, the system software checks the internal state of the computer based on the state data stored in the state memory MEM* (see FIG. 3). This includes the following data, which are continuously updated by the system software:

first state data which indicate the period of time in which the computer was without power;
second state data which indicate the temperature of the main processor;
third state data which indicate whether a housing in which the computer is installed has been opened; and/or
fourth state data which indicate whether an external storage medium is used for the system startup of the computer which is not a component of the computer.

In a step 111, on the basis of the first state data, it is initially checked whether the period of time t (so-called downtime) in which the computer was without power is less than a predefined period of time $t_0$. This is a parameter which defines a minimum period of time $t_0$ which is required for clearing of the data stored in the main memory 3 due to lack of power. If this minimum period of time (since the last shutdown of the computer) has not been reached, sensitive data are located in the main memory which could be spied out via a cold-boot attack. If the period of time $t_0$ has been reached or exceeded, it is assumed that the main memory has already lost its content via natural decay. Therefore, the flow jumps immediately to step 130, which indicates that the random access memory does not have to be deleted or overwritten. Subsequently, in step 140, a restart (reboot) may be initiated immediately.

However, if the measured period of time t is less than t0, a cold-boot attack could be successful. Therefore, the next step 112 is carried out to defend against a possible attack. There, it is checked whether the temperature T of the main processor 1 (see FIG. 3) is less than a second parameter, i.e., less than a predefinable minimum temperature $T_K$, which is regarded as a threshold value which is not undershot during normal operation of the main processor. If the measured temperature T is equal to or greater than $T_K$, it is assumed that a normal operating state exists and that a cold-boot attack is not taking place. In this case, the flow jumps to step 130, which indicates that the random access memory does not have to be cleared or overwritten. Subsequently, in step 140, a reboot may be initiated immediately.

However, if the measured temperature T is below TK, this is taken as an indication of a cold-boot attack, and step 120 is initiated. In this step, the random access memory is cleared, so that it is no longer possible to store any more sensitive data in it. The content of the random access memory may also be overwritten with pseudo-data in order to deceive the attacker as to the presence of data. Following step 120, a reboot is initiated in step 140.

In FIG. 1, additional optional checking steps 113 and 114 are indicated by dashed diamonds. These and possibly other checking steps may also be optionally carried out. Step 113 relates to a check of the state which indicates whether or not the computer housing has been opened. If yes, this indicates a cold-boot attack. Step 114 relates to a check of the state which indicates whether or not booting was carried out by a third-party storage medium. If yes, this also indicates a cold-boot attack. At least two criteria are always checked based on the state data, thus substantially increasing the reliability of the method.

Figure 2:
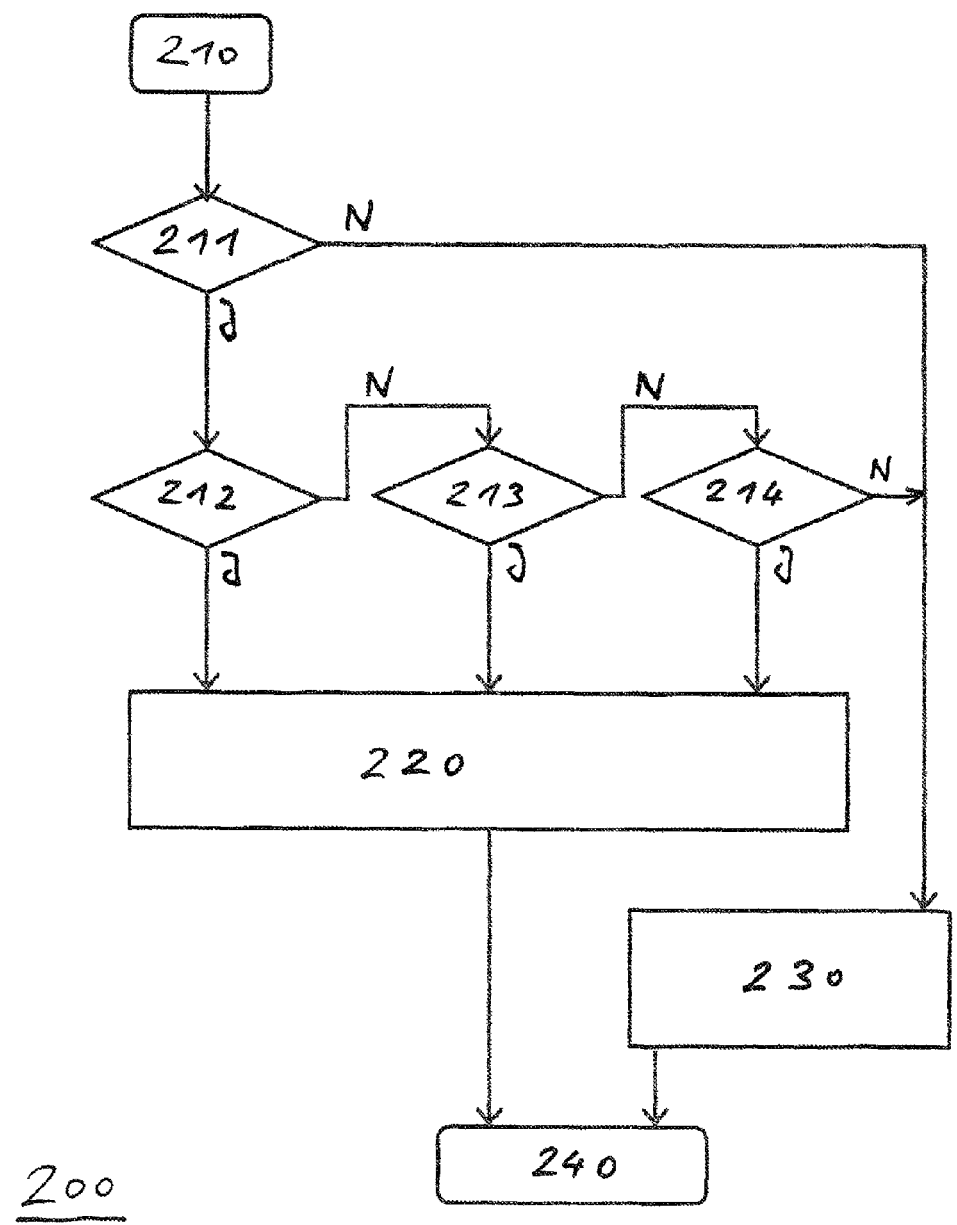
FIG. 2 shows a flow chart for a method according to a second exemplary embodiment of the present invention.

FIG. 2 shows a second exemplary embodiment which builds on the previous example. The method 200 therefore includes steps 211, 212, 220, 230 and 240, which correspond to steps 111, 112, 120, 130 and 140, and thus do not have to be described in greater detail here. Steps 213 and 214 correspond to the optional steps 113 and 114 (see FIG. 1) already mentioned previously, these steps being integrated into the method 200 according to FIG. 2 as follows:

If it is detected in Step 211 that the downtime t is less than a threshold value t0, the risk generally exists that a cold-boot attack could be successful. However, if it is detected in step 212 that the processor temperature T is not less than TK, this does not indicate a cold-boot attack. However, another criterion is subsequently checked in at least one additional step in order to check additional indicators of a possible cold-boot attack. For this purpose, in the present example according to FIG. 2, it is checked in step 213 whether a sensor indicates that the housing of the computer has been opened. If this is the case, then this indicates a cold-boot attack, and step 220 may be initiated to clear the random access memory. If this is not the case, then it is checked in another step 214 whether a third-party boot medium has been accessed. If this is the case, then this is an indicator of a cold-boot attack, and step 220 may be initiated for clearing the random access memory. Otherwise, the random access memory is not deleted (step 230) and a reboot (step 240) is initiated immediately.

If at least two indicators indicate a cold-boot attack, the random access memory is cleared. Additionally, it may also be provided that the content of the graphics memory of the computer is cleared or overwritten in order to prevent the attacker from being able to reconstruct the screen displays.

With the aid of the present invention, it is possible to prevent cold-boot attacks securely and reliably. In particular, attacks may be prevented in the self-service environment, which would generally proceed as follows:
a) The system PC is running and stores sensitive data such as customer-related data or cryptographic keys in its main memory (random access memory)
b) The attacker restarts the computer by briefly interrupting the power supply.
c) While the computer is starting up, the attacker causes specialized software to run, for example, by booting from an external medium which reads out the entire memory area and saves it on the external medium or which analyzes it online and saves important data.
d) The attacker restarts the computer again; this time, the original operating system starts up, and the self-service terminal again goes into operation. Other than an entry in the log file about the reboot, no trace of the attack remains.
e) The attacker analyzes the data offline in his/her laboratory and is able to carry out additional steps, depending on the objective of the attack.

By carrying out the checks of multiple state criteria according to the present invention, the reliability for positively detecting cold-boot attacks is improved considerably. The present invention may be implemented without great effort in existing systems.

What is claimed is:

1. A method (100; 200) for defending against cold-boot attacks on a computer (PC) in a self-service terminal, including the following steps, which are carried out by means of a main processor (1) and a system software program (5) configured for a system startup of the computer (PC):
   checking state data stored in a state memory (MEM*) to which the system software (5) has access and that include at least two of the following state data items:
      first state data that indicate the period of time (t) in which the computer (PC) was without power;
      second state data that indicate the temperature (T) of the main processor (1);
      third state data that indicate whether a housing in which the computer (PC) is installed has been opened; and/or
      fourth state data that indicate whether an external storage medium is used for the system startup of the computer (PC) that is not a component of the computer (PC);
   wherein the checking of the state data items is carried out to determine deviations from parameters ($t_0$, $T_k$) that are defined for a normal state of the computer (PC) include checking:
      whether the period of time (t) in which the computer (PC) was without power is less than a first parameter that defines a minimum period of time ($t_0$) that is required for clearing of the data stored in the main memory (3) due to lack of power; and
      whether the temperature (T) of the main processor (1) is less than a second parameter that defines a minimum temperature ($T_K$) that is not undershot during normal operation of the main processor (1);
   the method further comprising:
      clearing or overwriting (120) at least subareas of the main memory (3) if deviations from the parameters ($t_0$, $T_K$) are determined for at least two of the checked state data items; otherwise, not clearing or overwriting (130) the main memory (3); and
      carrying out (140) the system startup of the computer (PC) by means of the configured system software (5).

2. The method (200) of claim 1, further comprising checking (213) whether a third parameter has been satisfied to indicate the state of the opened housing.

3. The method (100, 200) of claim 1, wherein, clearing or overwriting (120, 220) at least subareas of a graphics memory of the computer (PC) if deviations from the parameters ($t_0$, $T_K$) are detected for at least two of the checked state data items.

4. The method (100, 200) of claim 1, further comprising enabling a selection of at least two checks to be carried to the user as a function of rights that a user has for using the computer if at least three of the state data items for checking are detected.

5. A self-service terminal including a computer (PC) and operating means (MON, KBD) connected to the computer (PC), the computer being configured for operating the self-service terminal by a user and for defending against cold-boot attacks main processor (1) and a system software program (5) configured for the system startup of the computer (PC), and a state memory (MEM*) to which the system software (5) has access and in which at least two of the following state data items are stored:
   first state data that indicate the period of time (t) in which the computer (PC) was without power;
   second state data that indicate the temperature (T) of the main processor (1);
   third state data that indicate whether a housing in which the computer (PC) is installed has been opened; and/or
   fourth state data that indicate whether an external storage medium is used for the system startup of the computer (PC) that is not a component of the computer (PC);
wherein the system software (5) is configured for:
   updating the state memory (MEM*) at least during each interrupt-controlled process during the shutdown and/or reboot;
   checking the state data items to determine deviations from parameters ($t_0$, $t_k$) that are defined for a normal state of the computer (PC), the checking of the state data items include: checking whether the period of time (t) in which the computer (PC) was without power is less than a first parameter that defines a minimum period of time ($t_0$) that is required for clearing of the data stored in the main memory (3) due to lack of power, and checking whether the temperature (T) of the main processor (1) is less than a second parameter that defines a minimum temperature ($T_K$) that is not undershot during normal operation of the main processor (1);

clearing or overwriting (120) at least subareas of the main memory (3) if deviations from the parameters ($t_0$, $T_K$) are determined for at least two of the checked state data items, otherwise, not clearing or overwriting (130) the main memory (3); and carrying out (140) the system startup of the computer (PC) by means of the configured system software (5).

6. The self-service terminal of claim 5, wherein the self-service terminal or the computer (PC) includes at least one sensor that detects an opening of the housing in which the computer (PC) is installed.

* * * * *